United States Patent [19]

Peacock

[11] 4,297,055
[45] Oct. 27, 1981

[54] METHOD OF INSTALLING UNDERGROUND PIPE

[76] Inventor: Richard C. Peacock, 2726 Waiwai Loop, Honolulu, Hi. 96819

[21] Appl. No.: 119,826

[22] Filed: Feb. 8, 1980

[51] Int. Cl.³ .............................................. E03F 3/06
[52] U.S. Cl. ...................................... 405/184; 43/124; 175/22; 405/43
[58] Field of Search ...................... 405/184, 36, 43–50; 175/21, 22; 166/50, 71, 77; 43/124; 137/357

[56] References Cited

U.S. PATENT DOCUMENTS

| | | | |
|---|---|---|---|
| 1,894,446 | 1/1933 | McKenny | 405/184 X |
| 3,330,120 | 7/1967 | Atkinson | 405/43 |
| 3,422,626 | 1/1969 | Hanrahan | 405/43 |
| 3,602,248 | 8/1971 | Peacock | 137/357 |
| 3,774,556 | 11/1973 | Poll | 43/124 X |

OTHER PUBLICATIONS

"Jack Pipeline Under River Bed", Engr. News Record, vol. 144, Issue 1, Jan. 5, 1950, p. 44.

Primary Examiner—Ernest R. Purser
Attorney, Agent, or Firm—Harvey B. Jacobson

[57] ABSTRACT

A process of installing a pipe system under an existing building constructed upon a concrete slab or other foundation not permitting access beneath the ground floor, for the purpose of periodic introduction of insecticide to control or eradicate subterranean termites or other such pests, comprising forming a substantially horizontal hole or accessway beneath the building slab or foundation, inserting a pipe through the formed hole, the pipe being made of a plastic or flexible material containing apertures for discharging the insecticide, the pipe being inserted in the hole or accessway by capping one end of the pipe and inserting a solid push rod into the pipe until the push rod contacts the capped end whereby the pipe can be pushed through the hole or accessway without lateral or vertical displacement.

5 Claims, 7 Drawing Figures

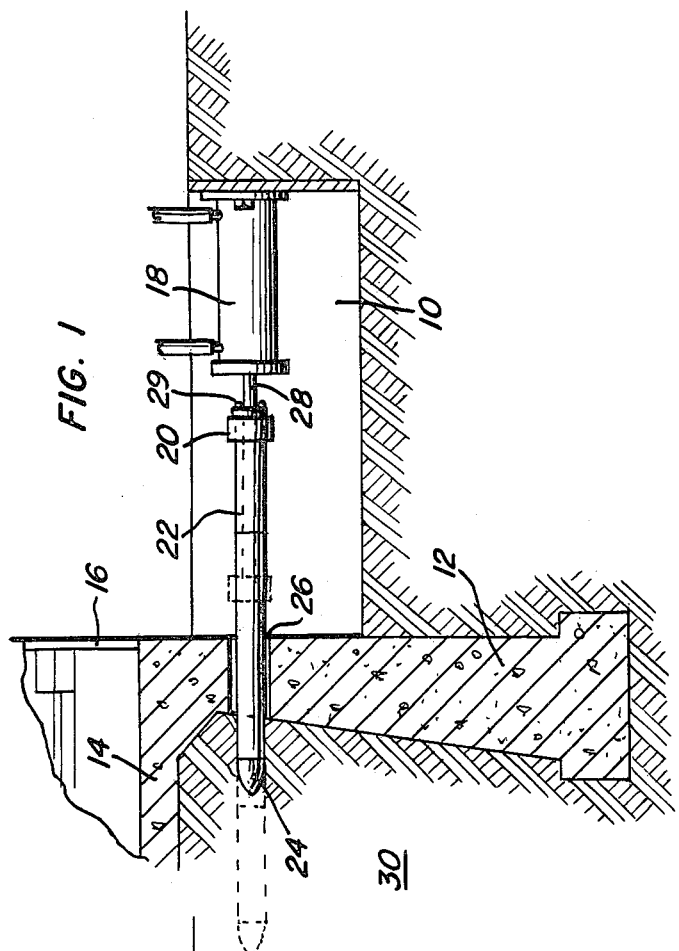
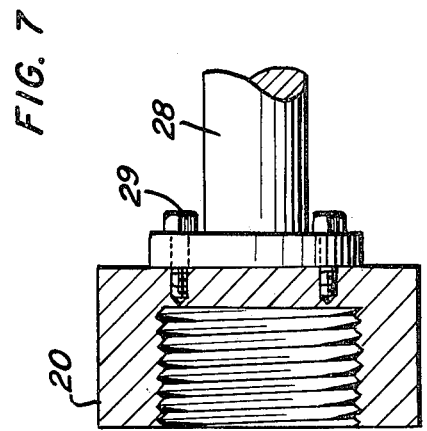
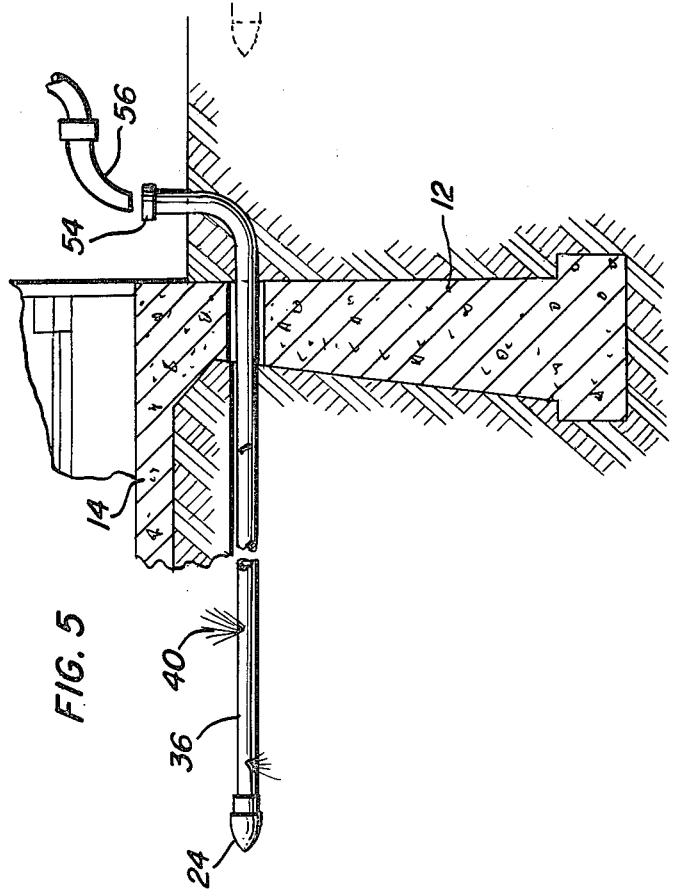
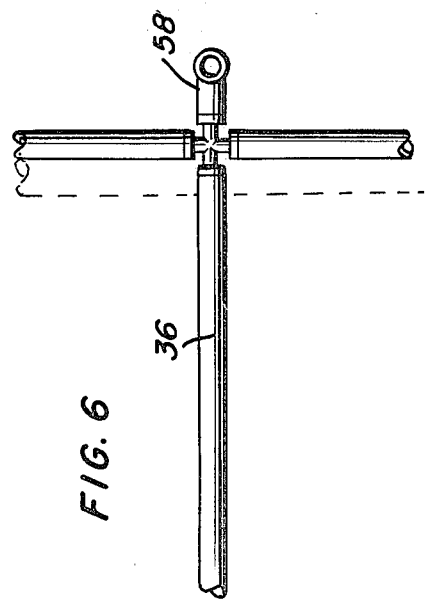

METHOD OF INSTALLING UNDERGROUND PIPE

BACKGROUND OF THE INVENTION

Field of the Invention

Recent entomological studies indicate that ground termites have highly developed sensory glands and radarlike antennas or other detecting devices which enable them to seek out and attack wood by a direct route.

Experience has shown that ground termites generally attack loadbearing walls or other structural walls in order to gain access to interior wood. Strangely enough, the termite will make his way through hollow tile or brick in order to achieve his mark in the most direct manner. Termites construct tunnels through fissures in the building materials which quickly fill with moisture required to sustain insect life. By means of these tunnels, they gain access to adjoining wood structures. Experimental observation indicates that termites secrete an acid which tends to break down concrete at such points as construction joints, slab separation, hairlike cracks and openings which the termites continue to enlarge until a tunnel through the joint or separation is completed. Once access to the wood is gained, the termite can being extensive and costly damage to wood. At the present time, a standard treatment for termites is to drill holes along both sides of all foundation and other walls followed by the injection of insecticide into the holes. This causes saturation of the soil around the foundation with the intended result of repelling termites. In effect, this type of treatment lays down a toxic barrier between the entire house which does not necessarily kill termites but discourages them from gaining access to the structure. Although this process is used with some success, the benefits of a treatment are not permanent and periodic rejuvination of such chemicals is necessary to maintain protection.

In the construction of new buildings or other structures, exterminators are frequently called upon to permeate a foundation slab ground surface with suitable chemicals prior to the pouring of slab concrete. This process also creates a toxic barrier repelling termites from a course under the building. The chemicals are absorbed by the ground around the foundation walls for protection of the entire foundation structure. However, this preconstruction treatment also has its effectiveness terminated after a few years.

In U.S. Pat. No. 3,602,248, issued Aug. 31, 1971, the present inventor discloses a process of controlling termite infestation by providing a piping system under the foundation which infuses insecticide in the ground surrounding the foundation at predetermined intervals after the structure has been completed. Slots or apertures are formed in the piping so that the insecticide can flow into the ground along the pipe. Typically, the floor plan of the structure is utilized so that the piping is laid along all wall lines and posts, all plumbing and waterline laterals, and any structural section which is expected to include a wood floor at a future time. The piping system is laid before the concrete slab is poured. While this patented system has proven successful, existing buildings or structures cannot utilize this system after the concrete slab has been formed and thus control of termites must be accomplished by the expensive and time consuming method of drilling a plurality of holes along the foundation.

The present invention relates to a process of installing a pipe system under an existing building constructed upon a concrete slab or other foundation not permitting access beneath the ground floor, for the purpose of periodic introduction of insecticide to control or eradicate subterranean termites or other such pests. Once the pipe system is installed, it is essentially that described by the termite control system of the aforementioned patent.

DISCLOSURE STATEMENT

There are several patents describing methods of installing underground pipe. One such device is U.S. Pat. No. 1,210,187, issued Dec. 26, 1916, to Marquiss, in which a jack having a plunger and a lever for operating the plunger is engaged with a socket placed at one end of a rod, the other end of the rod comprising a head such that the plunger of the jack pushes the rod to form a hole. A pipe can be installed in the formed hole. The rod can be formed in sections which are secured together so that a longer hole can be drilled in the ground. This patent, however, is not concerned with laying pipe for control of termites or other such pests and does not teach the specific method of installing a plastic or flexible pipe inside the formed hole as does the present invention.

SUMMARY OF THE INVENTION

The present invention provides for a process of installing a pipe system under an existing building for the purpose of periodic introduction of insecticide to control or eradicate subterranean termites or other such pests. The process for installing the underground pipe comprises pushing a power head through the ground by the use of hydraulic jacks or the like in which the power head is placed on a jack casing which can be lengthened by the addition of other casing sections, wherein the casing is secured to the jacking mechanism opposite the end which supports the power head. Once a hole or accessway of desired length is formed, a pipe such as a plastic tubing or flexible tubing is inserted into the jack casing and is pushed therethrough until the end of the pipe reaches the power head. To prevent lateral or vertical displacement of the tube as it is being inserted in the hole formed by the power head, an end cap is placed on one end of the plastic tubing and a solid push rod is inserted through the tubing until one end contacts the end cap, whereby the plastic tubing is inserted in the hole by the force of the solid push rod on the end cap. The plastic or flexible tubing is provided with apertures so that an insecticide can be discharged therethrough at periodic intervals.

Accordingly, it is an object of the present invention to provide a method for installing underground pipe under existing buildings or other structures.

Another object of the invention is to provide a method of installing a flexible pipe underneath existing buildings without substantial vertical or lateral displacement of the pipe.

A further object of the invention is to provide a method for installing underground pipe for a termite control system.

A still further object of the invention is to provide a method of installing underground pipe by means of a power head placed at one end of a jack casing which drills a substantially horizontal hole through the earth by means of a jacking mechanism placed at the opposite end of said casing and wherein a plastic or flexible tubing is inserted through the jack casing to the power head to provide an underground piping system.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is an elevational view showing the apparatus for forming a horizontal hole or accessway through the foundation and underneath the concrete slab shown in section, the dotted line showing the progression of the power head and jack casing of the invention.

FIG. 5 is an elevational view showing the installed piping system connected to a source of pesticide to treat the ground nearest to the wall and foundation structures shown in section.

FIG. 6 is an elevational view showing a series of installed underground pipes be connected to a central spigot for the pumping of an insecticide.

FIG. 7 is a cross-sectional view illustrating how the jack plate can be fitted onto the jack piston.

DETAILED DESCRIPTION OF THE INVENTION

Figure 2:
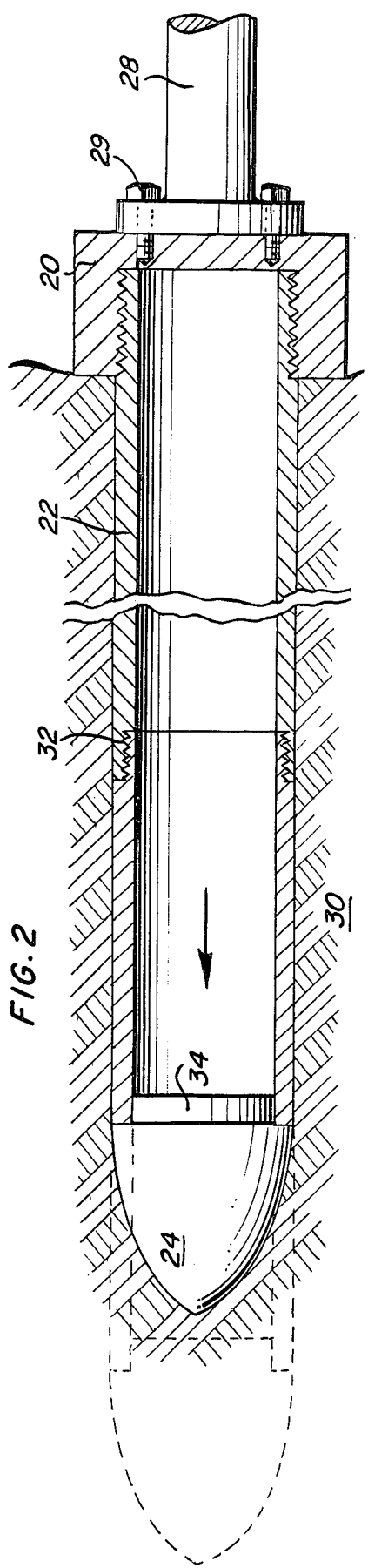
FIG. 2 is a cross-sectional view of the jack casing, and jack plate used to push the power head to form the horizontal hole or accessway underneath an existing building, the dotted line showing the progression of the power head and jack casing.

The present invention provides for a method of installing a pipe system under an existing building. Referring to FIG. 1, a trench 10 is dug adjacent footing 12 and concrete slab 14 of an existing building or structure 16. A hydraulic jack 18 is supported in trench 10 and supports hydraulic jack plate 20 into which is supported jack casing 22 and power head 24. In the method of the present invention, power head 24 is slipped into jack casing 22 and is placed in predrilled hole 26 formed in footing 12. Hydraulic jack plate 20 is screwed onto the opposite end of jack casing 22. The jack plate is secured to hydraulic jack piston 28 of hydraulic jack 18 by means of locking bolts 29. The jack plate 20 can be of conventional construction and may be able to accommodate a plurality of jack pistons. A horizontal hole is drilled through ground 30 by rotation or reciprocating movement of hydraulic jack piston 28, the dotted line showing the progression of power head 24 and jack casing 22. As power head 24 progresses through ground 30, additional sections of jack casing 22 can be added by means of threaded couplings 32 or the like so that the accessway for the pipe can be long enough to cover substantially the entire length of existing building 16.

Figure 3:
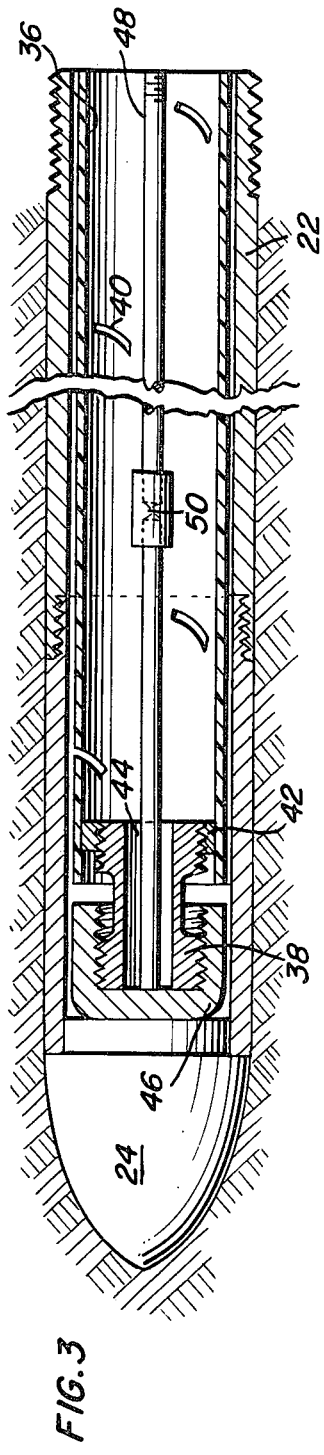
FIG. 3 is a cross-sectional view illustrating the means by which a flexible tube containing apertures is inserted through the jack casing and thus the formed hole.
Figure 4:
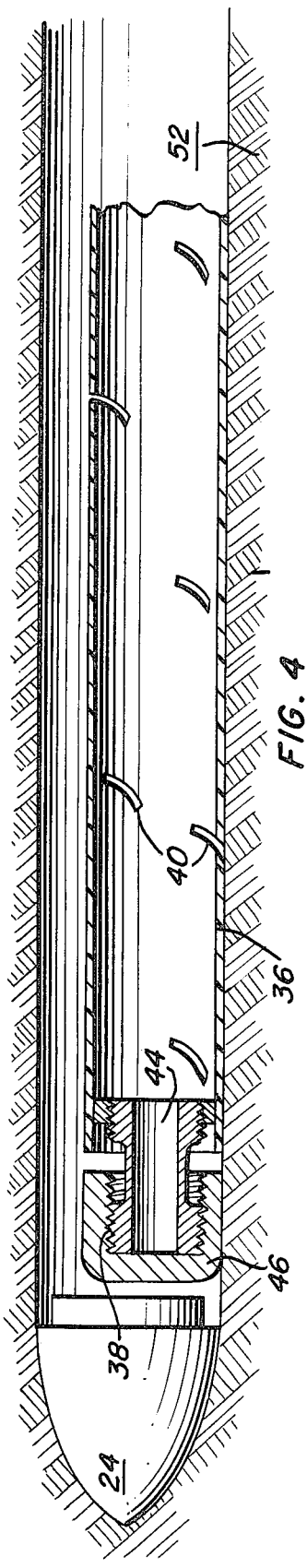
FIG. 4 is a cross-sectional view showing the installation of the flexible pipe or tube after the jack casing has been removed.

FIG. 2 illustrates the combination of power head 24, jack casing 22 and jack plate 20, the dotted line showing the progression of the hole forming means through ground 30. Power head 24 is slid onto the end of jack casing 22 by means of extension 34. The opposite end of jack casing 22 is screwed into jack plate 20 and the jack plate is rotated or reciprocated by means of piston 28 attached to jack plate 20 by means of locking bolts 29, as shown in FIG. 7, thereby progressing power head 24 through ground 30 to form an access hole for the pipe that is to be installed. The movement of power head 24 through the ground is continued until jack plate 20 reaches hole 26 in footing 12, whereby jack plate 20 is removed and another section of jack casing 22 is added, such as by threaded coupling 32. Jack plate 20 is again secured to the new section of jack casing and the power head 24 is progressed by further movement of jack piston 28. Sections of jack casing 22 are added until the desired length of hole is reached. Once power head 24 and jack casing 22 reach the desired lateral distance, jack plate 20 is removed and tubing such as polyethylene tubing 36 is inserted through jack casing 22. Since the tubing is flexible it is preferred to eliminate any lateral or vertical displacement of tubing 36 as it is inserted through jack casing 22. In FIG. 3, a means of maintaining the plastic tubing 36 rigid as it is inserted through jack casing 22 is illustrated. As shown, slip joint 38 is inserted in polyethylene tubing 36 which contains radial apertures 40 and clamped onto the end of plastic tubing 36 by means of clamp 42. Slip joint 38 contains slot 44 extending through its entire length. Slot 44 is capped at the end opposite the end which is inserted in side tubing 36 by end cap 46 which is threaded onto the end of slip joint 38. A solid push rod 48 is inserted into tubing 36 through slot 44 and against end cap 46 to push tubing 36 through jack casing 22. Push rod 48 can be lengthened by means of couplings 50. Once tubing 36 with attached slip joint 42 and end cap 46 reaches power head 24 at the end of the desired length of casing 22, outer casing 22 is removed from power head 24 and push rod 48 is removed from the tubing, leaving tubing 36 with associated slip joint 38, clamp 42, end cap 46 and power head 24 in formed trench 52. As shown in FIG. 4, slip joint 38, clamp 42, end cap 46, and push rod 48 can be made of any type of material, plastics being preferred due to their light weight.

Once flexible or plastic tubing 36 has been installed, it can be used in a method of controlling termites as described by the termite control system of aforementioned U.S. Pat. No. 3,602,248. As shown in FIG. 5, tubing 36 containing radial apertures 40 is assembled to pumping spigot 54 in which insecticide from hose 56 is discharged, thereby forcing insecticide through radial apertures 40 around footings 12 and slab 14 of building 16. As shown in FIG. 6, a series of pipes or tubing 36 can be installed underneath an existing building and secured to a central pumping spigot 58 to provide termite control in the ground surrounding all foundation sections and underneath wall structures. At the end of treatment, pump spigots 54 and 58 can be capped at the exterior of structure 16 until further insecticide treatment is necessary.

The present invention provides an improvement over existing termite control systems in that once installed, periodic termite control treatment comprises the pumping of insecticide through tube 36 and out radial apertures 40. Treatment for termites under existing buildings can now be performed whenever necessary in a quick and efficient manner as now the insecticide can be permeated throughout the soil surrounding the foundation and underneath concrete slab 14.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A method of installing underground pipe comprising forming a horizontal or lateral hole underneath the ground surface by securing a jacking mechanism to one end of a hollow casing, securing a tapered power head at the opposite end of said casing and moving said jacking mechanism to move said power head and associated casing through the ground, providing an open ended flexible tubing, said tubing including an end cap covering one end thereof, inserting a push rod inside said tubing and in contact with said end cap, and after said power head and associated casing have been moved the desired distance pushing said tubing through said hollow casing by use of force applied to said push rod, said push rod contacting said end cap and pushing the tube through said casing without lateral or vertical displacement of said flexible tubing, and removing said push rod and said casing from said power head after said end cap reaches said power head.

2. The method of claim 1 comprising extending the length of said hole by removing said jacking mechanism from said end of said casing, adding a second section of hollow casing to said casing, reattaching said jacking mechanism to the end of said second casing and then reoperating said jacket mechanism.

3. The method of claim 2 wherein said push rod is in separate sections joined together by a coupling mechanism to extend about the length of said casing.

4. The method of claim 1 wherein said hole is formed under an existing building constructed upon a concrete slab or other foundation not permitting access beneath the ground floor, said flexible tubing comprises a plurality of radial slits whereby fluid pumped through said tubing will pass through said slits into the adjacent ground.

5. The method of claim 4 comprising securing an end of said tubing opposite said power head to a pumping mechanism and pumping insecticide through said tubing and out through said radial apertures.

* * * * *